US006434185B1

(12) United States Patent
Struhsaker et al.

(10) Patent No.: US 6,434,185 B1
(45) Date of Patent: *Aug. 13, 2002

(54) CORRELATION SYSTEM FOR USE IN WIRELESS DIRECT SEQUENCE SPREAD SPECTRUM SYSTEMS

(75) Inventors: Paul F. Struhsaker, Wadsworth; Jane L. Smith, Akron, both of OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/641,289

(22) Filed: Aug. 17, 2000

Related U.S. Application Data

(63) Continuation of application No. 08/335,328, filed on Nov. 7, 1994, now Pat. No. 6,128,331.

(51) Int. Cl.[7] .................................................. H04K 7/00
(52) U.S. Cl. ...................................... 375/142; 375/150
(58) Field of Search ................................. 375/130, 134, 375/137, 140, 142, 145, 149, 150, 136, 147; 370/515

(56) References Cited

U.S. PATENT DOCUMENTS

| 4,550,414 A | 10/1985 | Guinon et al. |
|---|---|---|
| 4,774,715 A | 9/1988 | Messenger |
| 4,873,683 A | 10/1989 | Borth et al. |
| 4,894,842 A | 1/1990 | Broekhoven et al. |
| 5,305,347 A | 4/1994 | Roschmann et al. |
| 5,390,207 A | 2/1995 | Fenton et al. |
| 5,414,730 A | * 5/1995 | Lundquist et al. |
| 5,469,468 A | * 11/1995 | Schilling |
| 5,495,499 A | 2/1996 | Fenton et al. |
| 5,621,752 A | * 4/1997 | Antonio et al. |
| 5,734,674 A | 3/1998 | Fenton et al. |
| 5,809,064 A | 9/1998 | Fenton et al. |

\* cited by examiner

*Primary Examiner*—Jean Corrielus
(74) *Attorney, Agent, or Firm*—Arter & Hadden LLP

(57) ABSTRACT

A correlation system for use in wireless direct sequence spread spectrum systems includes a RF down converter which receives an encoded RF signal and generates therefrom analog in-phase (I) and quadrature (Q) signal components. These components are digitized and the digitized signals are then passed to each of the high precision correlator circuit and a low precision correlator circuit. The low precision correlator circuit consist of a bank of a plurality of low precision correlators which receive the I and Q signal components as inputs and correlates the same with progressively phase shifted or delay pseudo noise (PN) codes. A low precision correlation circuit locks on to the appropriate PN code phase shift or delay and applies the same as a reference PN code to the high precision correlation circuit for data acquisition and demodulation.

46 Claims, 1 Drawing Sheet

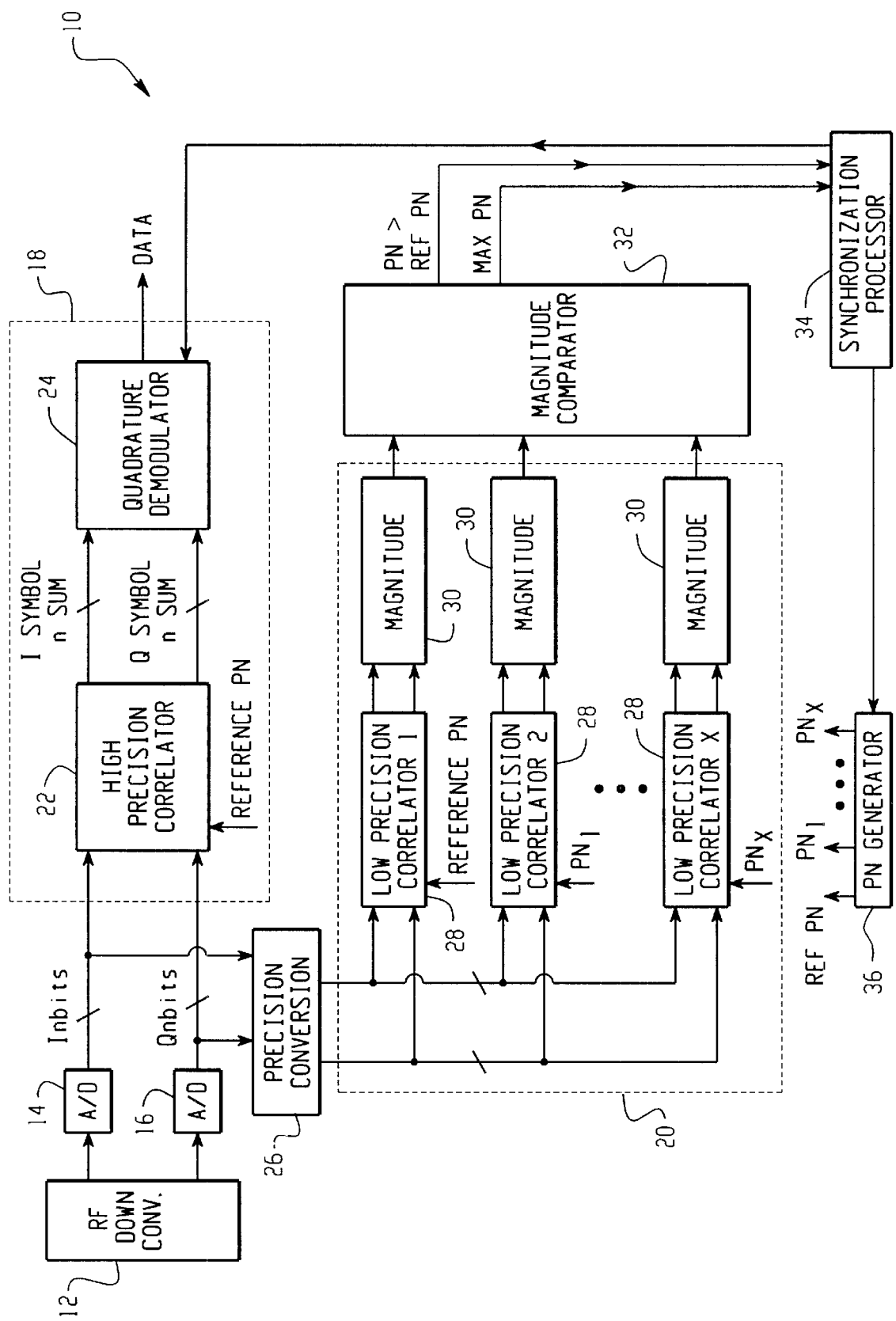

CORRELATION SYSTEM FOR USE IN WIRELESS DIRECT SEQUENCE SPREAD SPECTRUM SYSTEMS

RELATED APPLICATIONS

This application is a continuation of application Ser. No. 08/335,328, filed Nov. 7, 1994 now U.S. Pat. No. 6,128,331.

TECHNICAL FIELD

The invention herein resides in the art of devices and techniques for decoding spread spectrum signals and, more particularly, to such apparatus and techniques for synchronizing decoding signals generated by a receiver with a received spread spectrum signal. Specifically, the invention relates to a correlation system adapted for use with portable battery operated commuting and communication systems which typically employ burst transmissions such as radio packet data networks and wireless LANs.

BACKGROUND ART

Apparatus and techniques for direct sequence, spread spectrum modulating and demodulating data signals are well known. Modulation involves generating a periodic comparatively high frequency, repetitive pseudo noise code (PN code) and effectively mixing the data signal with a PN code as with an exclusive OR gate or a balanced mixer. The resulting signal is characterized by a very wide bandwidth and very low spectral energy density. To decode or demodulate a received spread spectrum signal, it is necessary to generate a decoding signal corresponding to the particular PN code previously used for encoding purposes and to apply both the received signal and the PN code to a balanced mixer or other means commonly referred to as a correlator.

It is known that spread spectrum modulation and demodulation are particularly useful for the transmission of data signals such as analog voice signals or digitized data in building interiors over radio frequency (RF) carriers. The low spectral density characteristic of such signals reduces the tendency for interference with other radio sensitive equipment. Additionally, spread spectrum techniques are known intrinsically to reduce interference between multiple reflected versions of a transmitted signal, as minimal phase differences between the local PN decoding signal and reflected signals results in low signal correlation and consequently demodulation of such multiple signals.

Acquisition and code tracking of Direct Sequence Spread Spectrum has traditionally been performed by one of two methods: (1) serial acquisition or (2) matched filter/full parallel acquisition. Serial acquisition has traditionally been used for continuous transmission systems where long acquisition times do not impair system performance. Matched filter/full parallel acquisitions have been generally applied to burst transmissions such as those used in radio packet data networks and wireless LANs where PN code lengths and data spreading ratios are greater than 100 chips. The disadvantage of the parallel approach is the excessive hardware complexity for a digital implementation and the high insertion loss and inflexibility to change data bandwidths and chip and signaling rates for SAW (Surface Acoustic Wave) matched filter implementations.

In general, prior art structures and techniques are not conducive to implementation in portable battery operated commuting and communications systems. Wireless packet networks and LANs use short PN codes. Accordingly, it appears that a hybrid multiple serial correlator approach may be used to increase acquisition rates, and reduce hardware complexity while providing complete flexibility to perform symbol, chip rate and code length changes within a packet burst.

In the prior art, as in U.S. Pat. No. 4,774,715, a basic multiple correlator acquisition system based on analog correlators is shown, but the same fails to provide the desired characteristics of optimal size and power reduction necessary for use in a portable battery operated system.

DISCLOSURE OF INVENTION

In light of the foregoing, it is a first aspect of the invention to provide a correlation system for use in wireless direct sequence spread spectrum systems which is adapted for use in wireless packet networks and LANs.

It is another aspect of the invention to provide a correlation system for use in wireless direct sequence spread spectrum systems which allows for an increase in acquisition rates over prior structures and techniques.

A further aspect of the invention is the provision of a correlation system for use in wireless direct sequence spread spectrum systems which greatly reduces hardware complexity and the cost, maintenance, and reliability concerns incident therewith.

Yet a further aspect of the invention is the provision of a correlation system for use in wireless direct sequence spread spectrum systems which greatly reduces power consumption over prior art structures and techniques.

Yet an additional aspect of the invention is the provision of a correlation system for use in wireless direct sequence spread spectrum systems which provides the flexibility and capability to perform symbol, chip rate, and code length changes within a packet burst and which allows the symbol period and code repetition period to be equal such that acquisition of the codes provides concurrent recovery of the symbol timing.

Still another aspect of the invention is the provision of a correlation system for use in wireless direct sequence spread spectrum systems which multiplexes a plurality of low precision correlators to periodically seek alternate PN codes exhibiting a higher level of responsiveness and finely adjust the system time clock by testing small time increment delays or shifts on either side of a selected PN code.

The foregoing and other aspects of the invention which will become apparent as the detailed description proceeds are achieved by: a direct sequence correlation systems, comprising: first means for receiving an RF signal and generating analog in-phase (I) and quadrature (Q) signal components; second means receiving and digitizing said I and Q signal components; a high precision correlation circuitry receiving said digitized I and Q signal components and providing signal demodulation thereof, a low precision correlation circuit receiving said digitized I and Q signal components and providing code search and code tracking for a PN code associated with said RF signal; and a synchronization processor interposed between said high and low precision correlation circuits for synchronizing said high precision correlation circuit with said PN code.

DESCRIPTION OF DRAWING

For a complete understanding of the objects, techniques, and structure of the invention, reference should be made to the following detailed description and accompanying drawing wherein a schematic diagram of the direct sequence correlation system according to the invention is shown.

BEST MODE FOR CARRYING OUT THE INVENTION

Referring now to the drawing, it can be seen that a direct sequence correlation system according to the invention is designated generally by the numeral 10. As a portion of the correlation system 10, an RF down converter 12 is a provided to receive a transmitted RF signal and provide an in-phase (I) and a quadrature (Q) signal therefrom. The analog I and Q signals are respectively passed to analog to digital converters 14, 16 which, in standard fashion, present multiple bit digitized output signals which correspond to the instantaneously received analog signals.

The digitized I and Q signals are then passed to each of two correlation circuits 18, 20. The correlation circuit 18 provides a high precision correlation function of the I and Q signals for data demodulation, while the correlation circuit 20 consists of a bank of a plurality of low precision correlators for purposes of tracking and locking onto the associated PN code.

The correlation circuit 18 consists of a high precision correlator 22 which, in the preferred embodiment of the invention, comprises a three or four bit correlator which accumulates the multiplied samples over the code repetition period of symbol period. Such high precision digital correlators, employing 2's complement addition circuitry to perform a pass/negate operation based on values of the signal sample and the PN code is known and understood by those skilled in the art. The outputs of the high precision correlator 22 are passed to a demodulator 24, which is capable of performing differential BPSK (Binary Phase Shift Key), QPSK (Quadrature Phase Shift Key), OQPSK (Offset Quadrature Phase Shift Key), and can be readily adapted to MPSK (BSK's of orders higher than 2n, 4 symbol states) implementation, to provide a digitized data output signal from the RF transmitted signal.

The digitized I and Q signals are also passed to the low precision correlation circuit 20 through a precision conversion circuit 26. The circuit 26 is operative to convert the I and Q signals to a format suitable for receipt and operation by the low precision correlation circuit 20 as will be discussed below. The correlation circuit 20 comprises a bank of low precision correlators 28, numbered 1-x in the drawing. Each of the low precision correlators receives the I and Q signals as formatted by the precision conversion circuit 26 and, in the preferred embodiment of the invention, are operative to perform a 1 or 2 bit correlations on the I and Q signals against a phase shifted PN code, but of a different phase shift or delay, which it correlates against the formatted I and Q signals.

The correlated I and Q outputs of the low precision correlators 28 are passed to respectively associated scaling or magnitude circuits 30. The output of each of the magnitude circuits is, theoretically, the scalar value of the signal comprising the correlated I and Q components. While such a signal would, in actuality, comprise the square root of the correlated values of $I^2$ and $Q^2$, the amplitude of such signal may be approximated by summing the scalar value of the larger of the correlated signals I and Q with one half of the scalar value of the smaller of those two signals. The scaling or magnitude circuits 30 perform such a function. Accordingly, the outputs of the magnitude or scaling circuits 30 are the respective magnitudes of the correlation functions of the I and Q signals against respectively phase shifted PN codes.

The scalar outputs of the magnitude circuits 30 are passed to a comparator 32 which serves to compare the outputs of the magnitude circuits 30 with each other. Accordingly, the comparator 32 is operative to identify the PN code phase shift which resulted in the maximum correlation and to similarly determine if any of the phase shifted or delayed PN codes resulted in a correlation which exceeded that of the reference PN code. The determinations are passed to a synchronization processor 34. The processor 34 is operative to control both the high precision correlation circuit 18 and the low precision correlation circuit 20. While providing for code search and code tracking, the synchronization processor 34 sets the reference PN signal to be equal to the maximum PN signal found on each cycle of the low precision correlation circuit 20. In other words, the present reference PN signal is compared with all other candidates, and if any of the candidates results in a better correlation than did the present reference PN signal, that candidate is designated as the new reference PN signal. This designation is achieved by the passing of an appropriate control signal to the PN generator 36. As shown in the drawing, the reference PN signal is applied to low precision correlator 1 of the bank 28, with the remaining low precision correlators 2-x of the bank 28 being of different phases shifts or delays of the PN code. With the reference PN signal being set as that delay or phase shift of the PN code corresponding to the maximum correlation, a determination can be made of the appropriate phase shift of the PN code for data demodulization when the maximum correlation attained by the low precision correlation circuit 20 is associated with the same phase shift of the PN code for a predetermined number of cycles. In other words, with the synchronization processor 34 always setting the reference PN to equal the PN phase shift associated with the maximum correlation, when the reference PN remains unchanged for a predetermined number of cycles of PN code repetition periods, there is a very high degree of probability that the associated PN code delay is, indeed, the appropriate delay for receipt and decoding of the signals received from the RF down converter 12. At this point, the synchronization processor 34 "locks" the reference PN code as being the one achieving the highest degree of correlation and enables the demodulator 24 of the high precision correlation circuit 18 to output the demodulated data with a high degree of confidence in the data's accuracy. In other words, the output of the demodulation 24 is "off" or disabled until the "lock" condition is met.

Once the "lock" condition is attained, signifying that a particular code phase has remained valid for a fixed period of time, the data demodulation process begins. However, the system 10 continues to search for alternate or stronger codes and periodically employs the low precision correlators 28 with fine time increment adjustments around the reference PN signal, both before and after the signal, to finely adjust the system time clock. This allows for optimization of the correlation peak which is coincident with the maximum correlation value of the reference PN code.

It should now be appreciated that the direct sequence correlation system 10 provides for PN code acquisition and tracking based upon multiple correlators with multiple precision correlation which will allow for reduced complexity and lower energy consumption for portable computing and communications devices with more rapid data acquisition than in the prior art. With all the processing being done on the chip, and with the total circuitry comprising CMOS elements, power consumption is extremely low. Additionally, since 95 percent of the operation of portable battery operated communications devices of the type in interest are in the receive mode, and with the receive mode requiring the least power, power consumption is remarkably low. Additionally, the low precision nature of the correlator 28 allows for a significant reduction in circuitry complexity and cost.

It will further be appreciated that the high precision processing circuit 18 is defined to provide high quality signal demodulization for data generation. The bit precision is preferably selected such that the bit error rate provides an acceptable Packet Loss Rate (PLR) for the communication system. The preferred implementation is three or four bit precision. The bank of low precision parallel correlators 28 of the correlation circuit 20 are provided for continuous code search and code tracking. The lower precision is selected so that the signal to noise ratio of the reduced complexity correlation bank 28 provides a Probability of Detect (PD) greater than the inverse of the PLR and a Probability of False alarm (PFA) which is less than the PLR. In the preferred embodiment for three bit high precision implementation a one bit (+1, −1,) or ternary (+1, 0/no operation, −1) lower precision is used. For the four bit high precision implementation, a five state (+2, +1,0/no operation, −1,−2) is implemented. The precision conversion circuit 26 is operative to format the I and Q digitized signals according to the precision of the low precision correlators 28.

The instant invention also provides for the use of partial correlation results for the low precision correlator bank 28. In implementation, the outputs of the magnitude circuits 30 are passed to the comparator 32 with the results thereof being passed to the synchronization processor 34 to allow for immediate initiation of corrective code search or tracking changes to the PN code generator 36 for the next PN code repetition cycle. Accordingly, the previously required PN code cycle code tracking and acquisition delay incurred by using full correlation is eliminated. This allows immediate changes to the PN code length within a single packet without loss of correlation. In the preferred embodiment, the partial correlation duration is set as the maximum permissible to account for the processing delay through the magnitude comparator 32 and the set up time required by the synchronization processor 34 to initiate PN codes for the next correlation cycle.

Those skilled in the art will further appreciate that the synchronization processor 34 does not use an absolute correlation level to ascertain code lock or loss of lock. Instead, the number of consecutive PN code repetition periods for which a specific PN code phase provides superior correlation level over all other possible PN codes phases establishes the lock condition. This code is then termed the reference code. Loss of lock is established by counting the number of times over a selected test period that the reference PN code fails to provide superior correlation performance. If the number of failures exceeds a predetermined threshold, loss of lock is declared and the PN code search is initiated as presented above. Accordingly, repetitive testing to be assured of code lock and proper data acquisition is constantly undertaken.

The relative correlation performance synchronization procedure just described greatly improves performance in multi-path and fade prone mobile computing device environments where correlation magnitude can fluctuate from near 0 correlation to full correlation within a packet. Under these conditions, systems which rely on an absolute correlation level fail.

In the preferred embodiment of the invention, data acquisition requires that the number of cycles for which the reference PN remains unchanged in order to enter into the lock mode be determined by dividing the number of samples per PN code that are employed by the number of samples searched per code period. For loss of lock, the preferred embodiment is to select a test length which reduces the false alarm rate below the PRF for a given signal environment. The threshold is set to the ratio of:

SPD (multiplied correlators)/[SPD (multiplied correlators)+PD (reference correlator)]

Thus it can be seen that the objects of the invention have been satisfied by the structure and technique presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A direct sequence correlation system, comprising:
   means for receiving an RF signal and generating analog in-phase (I) and quadrature (Q) signal components;
   means for receiving and digitizing said I and Q signal components;
   means for generating a demodulated signal from said digitized I and Q signal components, wherein said means for generating a demodulated signal includes means for a first precision correlation;
   means for generating code search and code tracking for a PN code associated with said RF signal, from said digitized I and Q signal components, wherein said means for generating code search and code tracking includes a plurality of parallel means for a second precision correlation, each said means for the second precision correlation receiving an incrementally phase shifted PN code different from the phase shift of the PN code received by all other said means for the second precision correlation;
   means for formatting said I and Q signal components, wherein said means for formatting is interposed between said means for receiving and digitizing said I and Q signal components and said means for generating code search and code tracking; and
   means for synchronizing said means for generating a demodulated signal with said PN code, and for controlling said means for generating a demodulated signal and said means for generating code search and code tracking, wherein said means for synchronizing is interposed between said means for generating a demodulated signal and said means for generating code search and code tracking.

2. The direct sequence correlation system according to claim 1, wherein said means for the first precision correlation performs at least a 3-bit correlation on said digitized I and Q signal components.

3. The direct sequence correlation system according to claim 2, wherein each said means for the second precision correlation performs less than a 3-bit correlation on said digitized I and Q signal components.

4. The direct sequence correlation system according to claim 1, wherein each of said means for the second precision correlation presents I and Q signal output components indicative of a correlation between said I and Q signals and said associated phase shifted PN code.

5. The direct sequence correlation system according to claim 4, wherein a means for determining amplitude is associated with each said means for the second precision correlation, said means for determining amplitude receiving said I and Q signal output components and generating a resultant scalar value associated therewith.

6. The direct sequence correlation system according to claim 5, further comprising means for comparing connected to said means for determining amplitude, said means for comparing receiving said resultant scalar value associated with each of said means for the second precision correlation, for presenting an output signal identifying the phase shifted PN code associated with said resultant scalar value of the highest amplitude.

7. The direct sequence correlation system according to claim 6, wherein said means for synchronizing applies to said means for generating a demodulated signal said phase shifted PN code associated with said resultant scalar value of the highest amplitude.

8. The direct sequence correlation system according to claim 7, wherein said means for the first precision correlation is interconnected with a demodulator, said means for synchronizing enabling said demodulator to pass data contained in said RF signal when said phase shifted PN code associated with said resultant scalar value of highest amplitude remains the same for a predetermined number of PN code repetition periods.

9. The direct sequence correlation system according to claim 8, wherein said means for synchronizing locks said phase shifted PN code associated with said resultant scalar value of highest amplitude as a reference PN code applied to said means for the first precision correlation, when said phase shifted PN code associated with said resultant scalar value of highest amplitude remains the same for a predetermined number of PN code repetition periods.

10. The direct sequence correlation system according to claim 9, wherein said means for synchronizing periodically tests said reference PN code against other phase shifted PN codes received by said plurality of means for the second precision correlation and changes said reference PN code applied to said means for the first precision correlation in the event one of said other phase shifted PN codes evidences a higher resultant scalar value than said reference PN code for a predetermined number of PN code repetition periods.

11. The direct sequence correlation system according to claim 1, wherein said means for formatting formats said digitized I and Q signal components for processing by said means for generating code search and code tracking.

12. The direct sequence correlation system according to claim 1, wherein said means for generating a demodulated signal has a bit precision providing a characteristic packet loss rate and said plurality of means for low precision correlation have a characteristic Probability of Detect (PD) which is greater than the inverse of said packet loss rate.

13. The direct sequence correlation system according to claim 12, wherein said plurality of means for the second precision correlation have a characteristic probability of false alarm which is less than said packet loss rate.

14. The direct sequence correlation system according to claim 1, wherein said means for synchronizing adjusts said PN code applied to said means for generating a demodulated signal, in response to said means for generating code search and code tracking presenting a stronger correlation output signal to a phase shifted test signal than to said PN code for a predetermined number of code periods.

15. The direct sequence correlation system according to claim 1, wherein said means for generating a demodulated signal includes means for performing Binary Phase Shift Key and Quadrature Phase Shift Key correlation.

16. The direct sequence correlation system according to claim 1, wherein said means for synchronizing adjusts a characteristic phase of said means for generating code search and code tracking during a PN code sequence and prior to commencement of a next such sequence.

17. The direct sequence correlation system according to claim 1, wherein said means for generating code search and code tracking performs fine tracking at less than one-half chip.

18. A direct sequence correlation system, comprising:
an RF down converter for receiving an RF signal and generating analog in-phase (I) and quadrature (Q) signal components;
at least one analog-to-digital converter for receiving and digitizing said I and Q signal components;
a first precision correlation circuit for receiving said digitized I and Q signal components, and providing signal demodulation thereof;
a second precision correlation circuit for receiving said digitized I and Q signal components, and providing code search and code tracking for a PN code associated with said RF signal;
a precision conversion circuit for formatting said I and Q signal components for processing by said second precision correlation circuit, said precision conversion circuit interposed between said at least one analog-to-digital converter and said second precision correlation circuit; and
a synchronization processor for synchronizing said first precision correlation circuit with said PN code, and for controlling said first and second precision correlation circuits, wherein said synchronization processing circuit is interposed between said first and second precision correlation circuits.

19. The direct sequence correlation system according to claim 18, wherein said first precision correlation circuit performs at least a 3-bit correlation on said digitized I and Q signals.

20. The direct sequence correlation system according to claim 19, wherein said second precision correlation circuit performs less than a 3-bit correlation on said digitized I and Q signals.

21. The direct sequence correlation system according to claim 18, wherein said second precision correlation circuit comprises a bank of parallel low precision correlators, each receiving an incrementally phase shifted PN code different from the phase shift of the PN code received by all other low precision correlators.

22. The direct sequence correlation system according to claim 21, wherein each of said low precision correlators presents I and Q signal output components indicative of a correlation between said I and Q signals and said associated phase shifted PN code.

23. The direct sequence correlation system according to claim 22, wherein an amplitude determination circuit is associated with each of said low precision correlators, for receiving said I and Q signal output components and generating a resultant scalar value associated therewith.

24. The direct sequence correlation system according to claim 23, further comprising a comparator, connected to said amplitude determination circuit and receiving said resultant scalar value associated with each of said low precision correlators, for presenting an output signal identifying the phase shifted PN code associated with said resultant scalar value of the highest amplitude.

25. The direct sequence correlation system according to claim 24, wherein said synchronization processor applies to said first precision correlation circuit said phase shifted PN code associated with said resultant scalar value of the highest amplitude.

26. The direct sequence correlation system according to claim 25, wherein said first precision correlation circuit comprises a high precision correlator interconnected with a demodulator, said synchronization processor enabling said demodulator to pass data contained in said RF signal when said phase shifted PN code associated with said resultant scalar value of highest amplitude remains the same for a predetermined number of PN code repetition periods.

27. The direct sequence correlation system according to claim 26, wherein said synchronization processor locks said phase shifted PN code associated with said resultant scalar value of highest amplitude as a reference PN code applied to said high precision correlator when said phase shifted PN code associated with said resultant scalar value of highest amplitude remains the same for a predetermined number of PN code repetition periods.

28. The direct sequence correlation system according to claim 27, wherein said synchronization processor periodically tests said reference PN code against other phase shifted PN codes received by said bank of low precision correlators and changes said reference PN code applied to said high precision correlator in the event one of said other phase shifted PN codes evidences a higher resultant scalar value than said reference PN code for a predetermined number of PN code repetition periods.

29. The direct sequence correlation system according to claim 21, wherein said precision conversion circuit formats said digitized I and Q signals for processing by said second precision correlation circuit.

30. The direct sequence correlation system according to claim 21, wherein said first precision correlation circuit has a bit precision providing a characteristic packet loss rate and said low precision correlators have a characteristic Probability of Detect (PD) which is greater than the inverse of said packet loss rate.

31. The direct sequence correlation system according to claim 30, wherein said low precision correlators have a characteristic probability of false alarm which is less than said packet loss rate.

32. The direct sequence correlation system according to claim 18, wherein said synchronization processor adjusts said PN code applied to said first precision correlation circuit in response to said second precision correlation circuit presenting a stronger correlation output signal to a phase shifted test signal than to said PN code for a predetermined number of code periods.

33. The direct sequence correlation system according to claim 18, wherein said first precision correlation circuit performs Binary Phase Shift Key and Quadrature Phase Shift Key correlation.

34. The direct sequence correlation system according to claim 18, wherein said synchronization processor adjusts a characteristic phase of said second precision correlation circuit during a PN code sequence and prior to commencement of a next such sequence.

35. The direct sequence correlation system according to claim 18, wherein said second precision correlation circuit performs fine tracking at less than one-half chip.

36. A method for decoding a spread spectrum signal, comprising:
receiving an RF signal;
generating analog in-phase (I) and quadrature (Q) signal components of the RF signal;
digitizing said I and Q signal components;
generating demodulated data from said digitized I and Q signal components, wherein said digitized I and Q signals are received by a first precision correlation circuit including a first precision correlator;
processing said digitized I and Q signal components according to a predetermined precision, to generate formatted I and Q signal components;
generating, from said formatted I and Q signal components, code search and code tracking for a PN code associated with the RF signal, wherein said step of generating code search and code tracking includes receiving an incrementally phase shifted PN code into a second precision correlation circuit including a bank of parallel second precision correlators, each of the second precision correlators receiving a phase shifted PN code different from the phase shifted PN code received by all other of the second precision correlators; and
synchronizing the generating of demodulated data with the PN code.

37. The method according to claim 36, wherein said step of generating demodulated data includes performing at least a 3-bit correlation on said digitized I and Q signal components.

38. The method according to claim 37, wherein each of the second precision correlators performs less than a 3-bit correlation on said digitized I and Q signals.

39. The method according to claim 36, wherein said step of generating code search and code tracking further includes:
presenting I and Q signal output components indicative of a correlation between said I and Q signals and said associated phase shifted PN code.

40. The method according to claim 39, wherein said step of generating code search and code tracking further includes:
generating a resultant scalar value associated with said I and Q signal output components.

41. The method according to claim 40, wherein said step of generating code search and code tracking further includes:
comparing each said resultant scalar value associated with each of the second precision correlators, and
presenting an output signal identifying the phase shifted PN code associated with said resultant scalar value of the highest amplitude.

42. The method according to claim 41, wherein said step of generating code search and code tracking further includes:
applying to at least one of the second precision correlators said phase shifted PN code associated with said resultant scalar value of the highest amplitude.

43. The method according to claim 42, wherein said demodulated data is output, when said phase shifted PN code associated with said resultant scalar value of highest amplitude remains the same for a predetermined number of PN code repetition periods.

44. The method according to claim 43, wherein said phase shifted PN code associated with said resultant scalar value of highest amplitude, is locked as a reference PN code applied to the first precision correlator when said phase shifted PN code associated with said resultant scalar value of highest amplitude remains the same for a predetermined number of PN code repetition periods.

45. The method according to claim 43, further comprising:
periodically testing said reference PN code against other phase shifted PN codes received by each of the second precision correlators; and changing said reference PN code applied to said first precision correlator in the event one of said other phase shifted PN codes evidences a higher resultant scalar value than said reference PN code for a predetermined number of PN code repetition periods.

46. The method according to claim 44, further comprising:

adjusting said PN code applied to said first precision correlator in response to said second precision correlators presenting a stronger correlation output signal to a phase shifted test signal than to said PN code for a predetermined number of code periods.

* * * * *